(12) United States Patent
Lu et al.

(10) Patent No.: US 11,583,762 B2
(45) Date of Patent: Feb. 21, 2023

(54) PERIPHERAL DEVICE

(71) Applicant: DEXIN CORPORATION, New Taipei (TW)

(72) Inventors: Ho-Lung Lu, New Taipei (TW); Chin-Lung Lin, New Taipei (TW); Shun-Chieh Chang, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/343,854

(22) Filed: Jun. 10, 2021

(65) Prior Publication Data

US 2022/0062755 A1    Mar. 3, 2022

Related U.S. Application Data

(60) Provisional application No. 63/069,765, filed on Aug. 25, 2020.

(30) Foreign Application Priority Data

Mar. 4, 2021  (TW) .................................. 110107642

(51) Int. Cl.
 *A63F 13/24*    (2014.01)
 *A63F 13/98*    (2014.01)
(52) U.S. Cl.
 CPC .............. *A63F 13/24* (2014.09); *A63F 13/98* (2014.09)
(58) Field of Classification Search
 None
 See application file for complete search history.

(56) References Cited

U.S. PATENT DOCUMENTS

| 9,081,545 | B1* | 7/2015 | Lin | G06F 1/1632 |
| 10,933,315 | B2* | 3/2021 | Fang | A63F 13/92 |
| 11,045,723 | B1* | 6/2021 | Lee | A63F 13/24 |
| 2009/0312098 | A1* | 12/2009 | Chang | A63F 13/22 463/31 |
| 2013/0341214 | A1* | 12/2013 | King | A63F 13/98 206/216 |
| 2014/0200085 | A1* | 7/2014 | Bares | A63F 13/98 463/47 |
| 2015/0018101 | A1* | 1/2015 | Schoenith | A63F 13/98 463/37 |
| 2015/0273325 | A1* | 10/2015 | Falc | G06F 1/1626 463/37 |

(Continued)

*Primary Examiner* — Tramar Harper
(74) *Attorney, Agent, or Firm* — Li & Cai Intellectual Property (USA) Office

(57) ABSTRACT

A peripheral device adapted for connecting to a mobile device is provided. The peripheral device includes a main body, at least one connecting arm, and at least one control module. The main body includes a clamping unit to clamp a mobile device in place. One end of the connecting arm is movably connected to one side of the main body, the connecting arm is movable and close to the one side of the main body to be in a storage position, or extends away from thereof to be in an expanded position. Each of the control modules includes at least one input unit, and the control module is detachably connected to another end of the connecting arm. When the connecting arm is in the expanded position, the control module is electrically connected to the mobile device, so as to provide control thereof.

3 Claims, 14 Drawing Sheets

(56) References Cited

U.S. PATENT DOCUMENTS

| | | | | |
|---|---|---|---|---|
| 2015/0281422 | A1* | 10/2015 | Kessler | H04M 11/007 |
| | | | | 455/557 |
| 2018/0375977 | A1* | 12/2018 | Deng | H04M 1/0247 |
| 2020/0155928 | A1* | 5/2020 | Guo | A63F 13/98 |
| 2020/0324197 | A1* | 10/2020 | Ho | A63F 13/92 |
| 2020/0353351 | A1* | 11/2020 | Mao | A63F 13/98 |
| 2020/0398171 | A1* | 12/2020 | McDole | A63F 13/98 |
| 2021/0346794 | A1* | 11/2021 | Gao | A63F 13/92 |
| 2021/0394048 | A1* | 12/2021 | Eichinger | A63F 13/24 |
| 2021/0396350 | A1* | 12/2021 | Eichinger | A63F 13/98 |
| 2022/0039280 | A1* | 2/2022 | Guerrero, Jr. | H05K 5/03 |

* cited by examiner

PERIPHERAL DEVICE

CROSS-REFERENCE TO RELATED PATENT APPLICATION

This application claims the benefit of priority to Taiwan Patent Application No. 110107642, filed on Mar. 4, 2021. The entire content of the above identified application is incorporated herein by reference.

This application claims priority to the U.S. Provisional Patent Application Ser. No. 63/069,765 filed on Aug. 25, 2020, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a peripheral device, and more particularly to a peripheral device that can clamp onto a mobile device and be electrically connected to the mobile device for a user to control the mobile device through the peripheral device.

BACKGROUND OF THE DISCLOSURE

With the emergence of smart phones and improvement of hardware performance thereof, various mobile games are rapidly being released on smart phones. The smart phones are, however, still limited to touch interfaces and can only provide virtual buttons for in-game controls, and virtual buttons have no realistic tactile feel like that provided by actual keyboards. Since a directivity of the virtual keyboard is not precise, a control experience is also greatly reduced. Conventional manners of touch control lack in authenticity; for example, a touch sensation reflecting an operating force of a user cannot be instantaneously fed back to the user.

In view of the abovementioned issues, the applicant of the present disclosure has proposed a "control handle" that can be combined with portable electronic devices via the Taiwan Patent Application Patent Publication Nos. TWM494350 and TWM494020. An external holding module is detachably assembled on the game handle device that can be used to clamp or carry the portable electronic device, so that the user can operate the portable electronic device through the game handle device.

However, an overall structure of the aforementioned control handle is still not convenient for storage and carrying. Therefore, how to improve the storability and portability of the peripheral device by improving a structural design of the control handle to overcome the above-mentioned shortcomings has become one of the issues to be solved in this technical field.

SUMMARY OF THE DISCLOSURE

In response to the above-referenced technical inadequacy, the present disclosure provides a peripheral device which can be adjusted to a storage state to facilitate storage or carrying, or be adjusted to an expanded state to connect to a mobile device for a user to easily control the mobile device through the peripheral device.

In one aspect, the present disclosure provides a peripheral device which is adapted to connect to a mobile device. The mobile device includes two sets of side edges, and the peripheral device includes a main body, at least one connecting arm, and at least one control module. The main body includes a clamping unit, and the clamping unit clamps one set of the side edges of the mobile device to fix the mobile device in place. One end of the at least one connecting arm is movably connected to one side of the main body, the at least one connecting arm can be moved close to the one side of the main body to be in a storage position, or can extend away from the one side of the main body to be in an expanded position. Each of the control modules includes at least one input unit, and the at least one control module can be detachably connected to another end of the at least one connecting arm. When the at least one connecting arm is in the expanded position, the at least one control module is adjacent to one of the sides of the mobile device. The at least one control module is electrically connected to the mobile device, so as to transmit signals from the at least one input unit to the mobile device.

In another aspect, the present disclosure provides a peripheral device which is adapted to connect to a mobile device. The mobile device includes two sets of side edges, and the peripheral device includes a main body, at least one control module, and at least one connecting arm. The main body includes a clamping unit, and the clamping unit clamps one set of the side edges of the mobile device to fix the mobile device in place. The at least one control module includes at least one input unit. One end of the at least one connecting arm is detachably connected to one side of the main body, another end of the at least one connecting arm is movably connected to one side of the control module, and the at least one connecting arm is in a storage position or an expanded position. When the at least one connecting arm is in the expanded position, the at least one connecting arm is distant away from the one side of the main body. The at least one control module is electrically connected to the mobile device, so as to transmit signals from the at least one input unit to the mobile device.

Therefore, one of the beneficial effects of the present disclosure is that, in the peripheral device provided herein, through the technical solutions of the connecting arms being movably connected between the main body and the control module, the connecting arms can be moved close to the one side of the main body to be in the storage position, or can extend away from the one side of the main body to be in the expanded position. In this way, the peripheral device of the present disclosure facilitates convenient storage or carrying.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
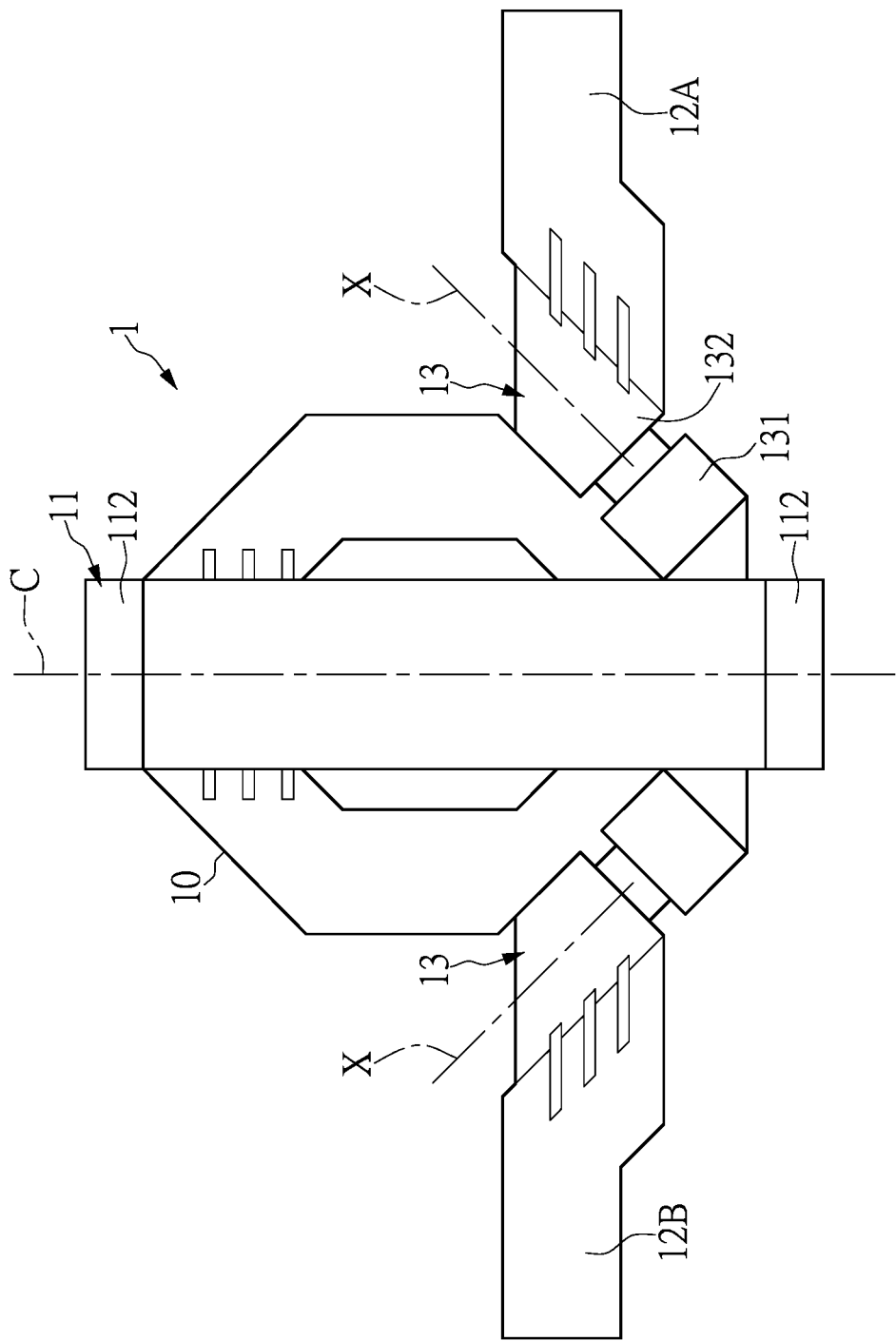
FIG. 1 is a schematic front view of a peripheral device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
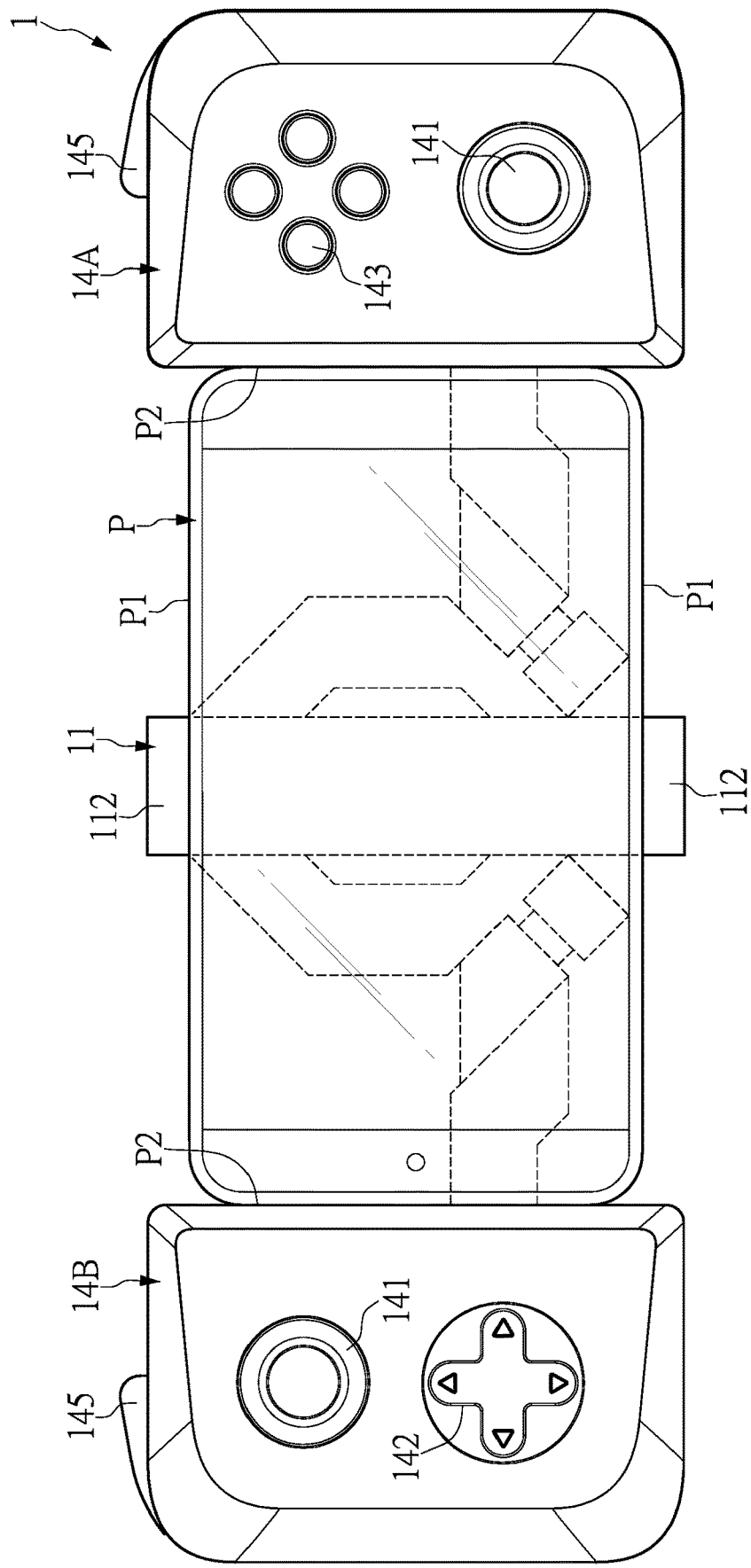
FIG. 2 is a schematic front view of the peripheral device combined with a mobile device according to the first embodiment of the present disclosure.

Referring to FIG. 1 to FIG. 5, a first embodiment of the present disclosure provides a peripheral device 1, which is adapted to connect to a mobile device P, such as a mobile phone, but the present disclosure is not limited thereto. The mobile device P is combined with the peripheral device 1, such that the mobile device P (i.e., the mobile phone) can further be conveniently controlled through the peripheral device 1. For the sake of brevity, the mobile device P has two sets of side edges defined thereon, that is, left and right lateral sides P1 and top and bottom short sides P2 (as shown in FIG. 2).

Figure 3:
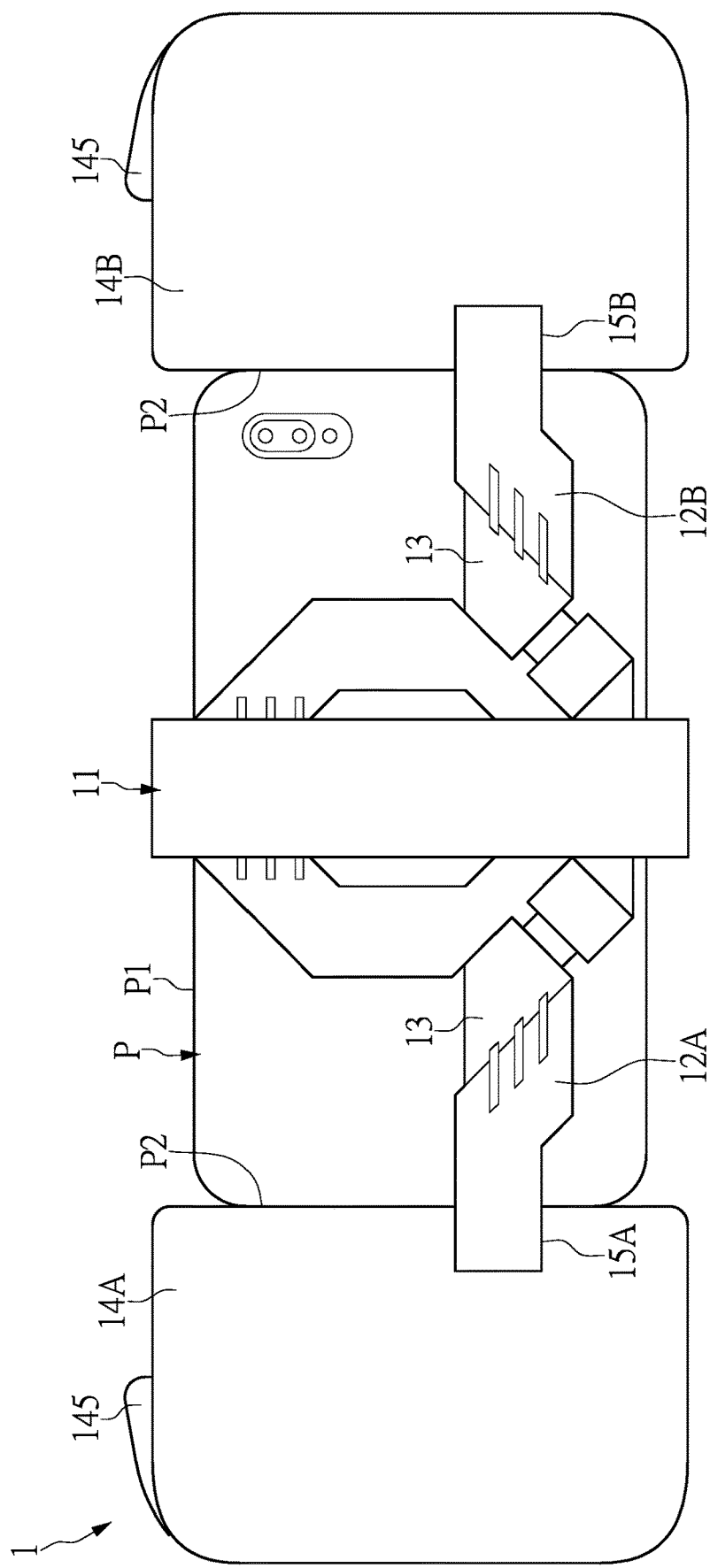
FIG. 3 is a schematic rear view of the peripheral device combined with the mobile device according to the first embodiment of the present disclosure.

The peripheral device 1 includes a main body 10, a pair of connecting arms 12A, 12B, and a pair of control modules 14A, 14B. The main body 10 includes a clamping unit 11. The clamping unit 11 has a pair of clamping portions 112 that can be next to each other or be elastically pulled apart from each other. For example, a spring can be used between the pair of clamping portions 112 to achieve a function of the clamping portions being pulled apart from each other or being next to each other. Furthermore, the clamping portions 112 can also work in cooperation with a guide rod, or a pair of intermeshing gears, so as to allow the clamping portions 112 to move even more stably. As shown in FIG. 2 and FIG. 3, the clamping unit 11 clamps one set of side edges (that is, the lateral sides P1 shown in FIG. 2) of the mobile device P and fixes the mobile device P in place. In the present embodiment, the pair of clamping portions 112 clamp the lateral sides P1 of the mobile device P, so that the mobile device P is placed horizontally. However, the present disclosure is not limited thereto, and the mobile device P can also be placed vertically.

Figure 4:
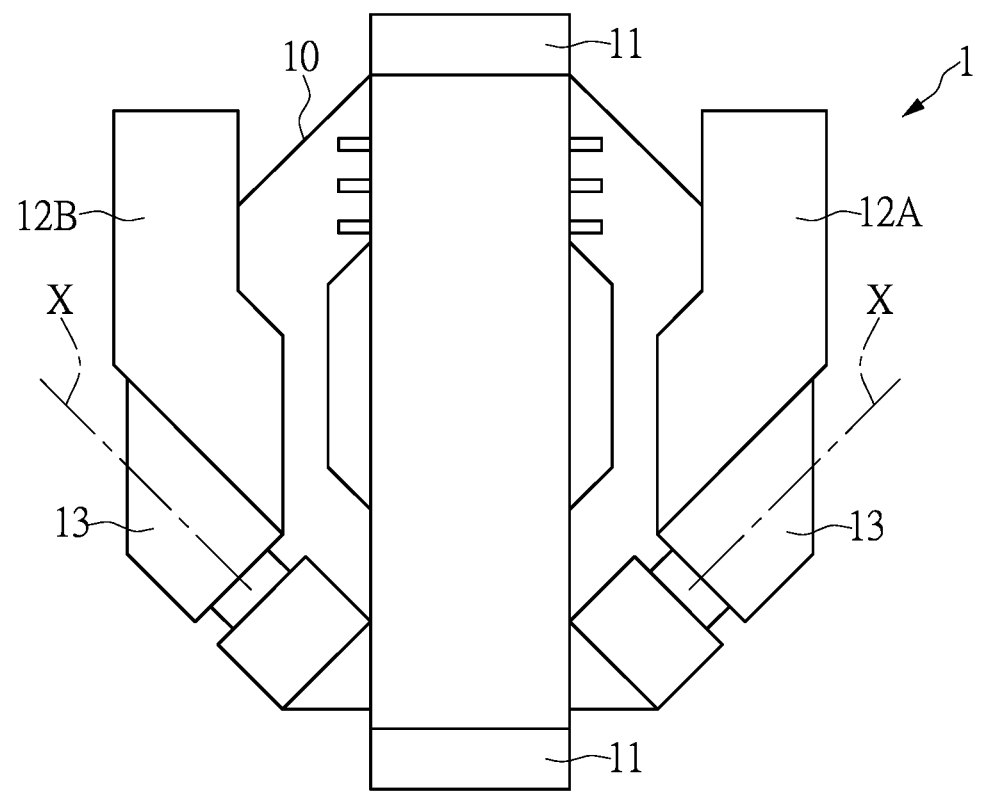
FIG. 4 is a schematic front view of the peripheral device in a stored state according to the first embodiment of the present disclosure.

One end of each of the connecting arms 12A, 12B is movably connected to one side of the main body 10, so that each of the connecting arms 12A, 12B can move close to one side of the main body 10 to be in a storage position (as shown in FIG. 4), or can extend away from one side of the main body 10 to be in an expanded position (as shown in FIG. 1 to FIG. 3). The storage position refers to a position where the connecting arms 12A, 12B are close to both sides of the main body 10, so as to reduce a width of the peripheral device 1 to facilitate storage. The expanded position refers to a position where the pair of connecting arms 12A, 12B of the peripheral device 1 extend away from the one side of the main body 10, that is, the peripheral device 1 is in an expanded state to provide a connection with the mobile device P.

As shown in FIG. 2, each of the control modules 14A, 14B includes at least one input unit (e.g., an input unit 141 that is a joystick). In the present embodiment, the control module 14B on the left side has three input units 141, 142, 145, and the control module 14A on the right side also has three input units 141, 143, 145. The control modules 14A, 14B can be detachably connected to another end of the connecting arms 12A, 12B, respectively.

When the connecting arms 12A, 12B are in the expanded position (as shown in FIG. 2 and FIG. 3), the control modules 14A, 14B are close to another set of side edges (that is, the short sides P2 shown in FIG. 2) of the mobile device P. Each of the control modules 14A, 14B is wirelessly connected to the mobile device P to transmit signals of the input units (141, 142, 143, or 145) to the mobile device P.

More specifically, the peripheral device 1 of the present embodiment further includes a pair of hinges 13. Each of the pair of hinges 13 is connected between one of the pair of connecting arms 12A, 12B and the main body 10. An axis X of each of the pair of hinges 13 in the present embodiment is inclined to a central line C of the main body 10. For example, each of the pair of hinges 13 can function like a door hinge, and a lower part of one of the hinges 13 includes a shaft sleeve 131 that is fixed to the main body 10, and an upper part of the one of the hinges 13 includes a rotating shaft 132 that is partly sleeved inside the shaft sleeve 131, so that the rotating shaft 132 is rotatably connected to the lower part of the shaft sleeve 131. The connecting arms 12A, 12B are fixed to the upper part of the rotating shafts 132 and rotate with the rotating shafts 132 relative to the shaft sleeves 131.

Figure 5:
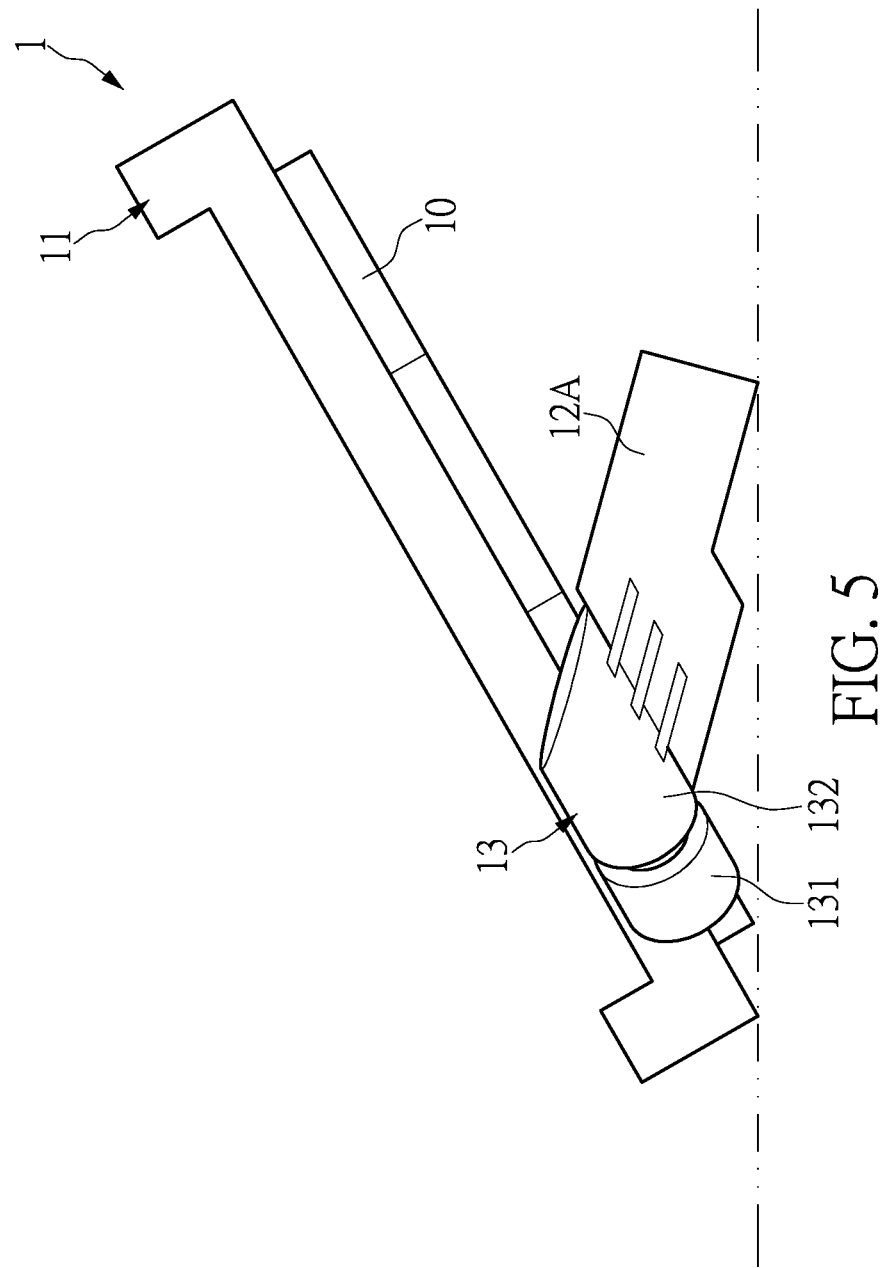
FIG. 5 is a schematic side view of the peripheral device in a supporting state according to the first embodiment of the present disclosure.

As shown in FIG. 5, in the peripheral device 1 of the present embodiment, the connecting arms 12A, 12B can also rotate to a rear side of the main body 10 to be in a supporting position. In this state, the peripheral device 1 can provide a same function as a phone stand, in which the mobile phone P is clamped and fixed by the clamping unit 11 and is inclined with the main body 10. The pair of connecting arms 12A, 12B can be rotated to the rear side of the main body 10 and function as supporting legs for supporting the main body 10 and the mobile device P.

In addition, in the peripheral device 1 of the present embodiment, the end of each of the connecting arms 12A, 12B can have a connector 15A, 15B provided thereon, respectively, the connectors 15A, 15B are each inserted into the pair of control modules 14A, 14B and are wiredly connected to the main body 10. In practical applications, the main body 10 can have a wireless module, or a battery, etc., (omitted in the figure) provided therein, so as to provide wireless connection to the mobile device P, or to provide power for the mobile device P.

In the present embodiment, the peripheral device 1 is exemplified as having a pair of connecting arms 12A, 12B and a pair of control modules 14A, 14B. However, in application of the present disclosure, one connecting arm and one control module can also be provided on only one side of the main body 10.

Second Embodiment

Figure 6:
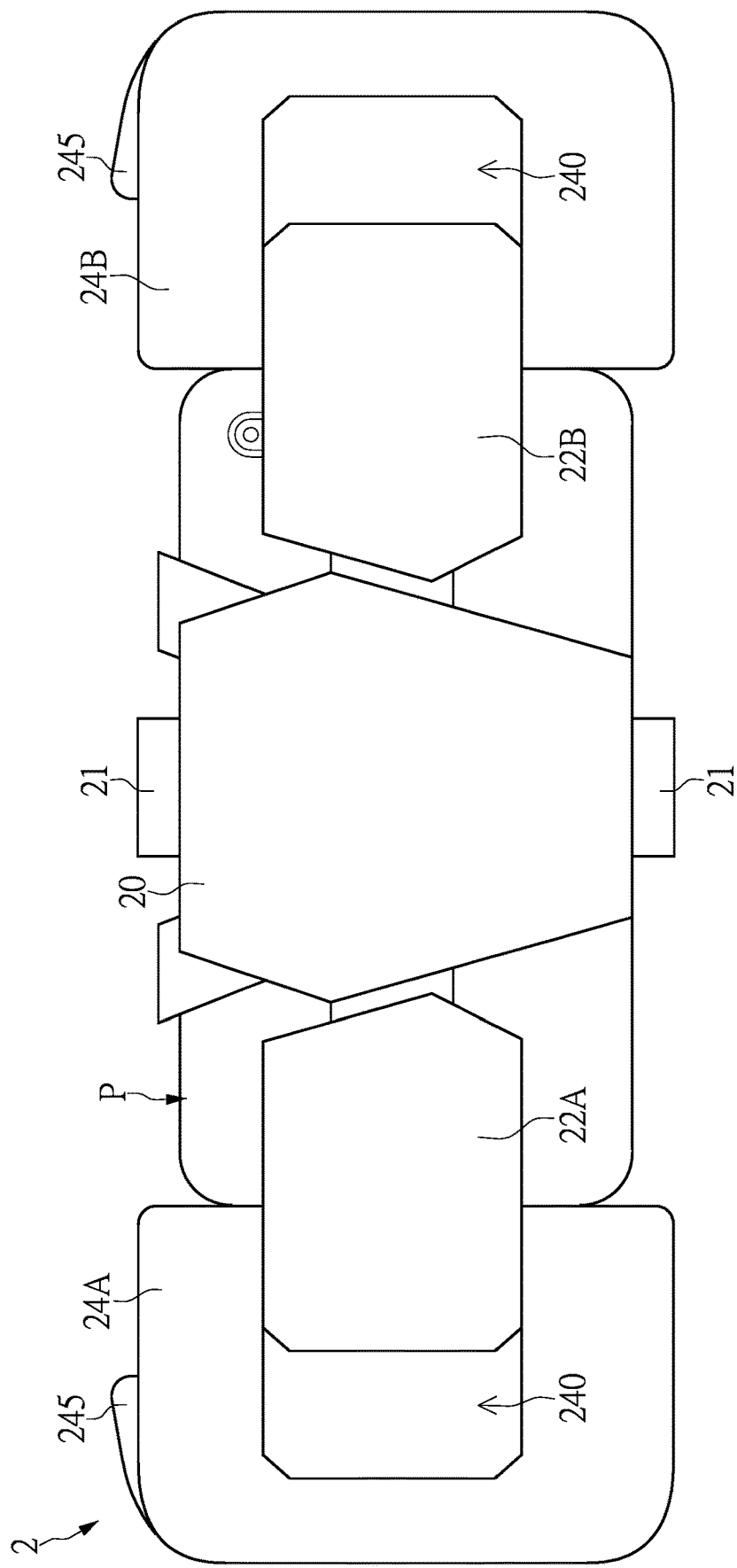
FIG. 6 is a schematic rear view of the peripheral device combined with the mobile device according to a second embodiment of the present disclosure.
Figure 7:
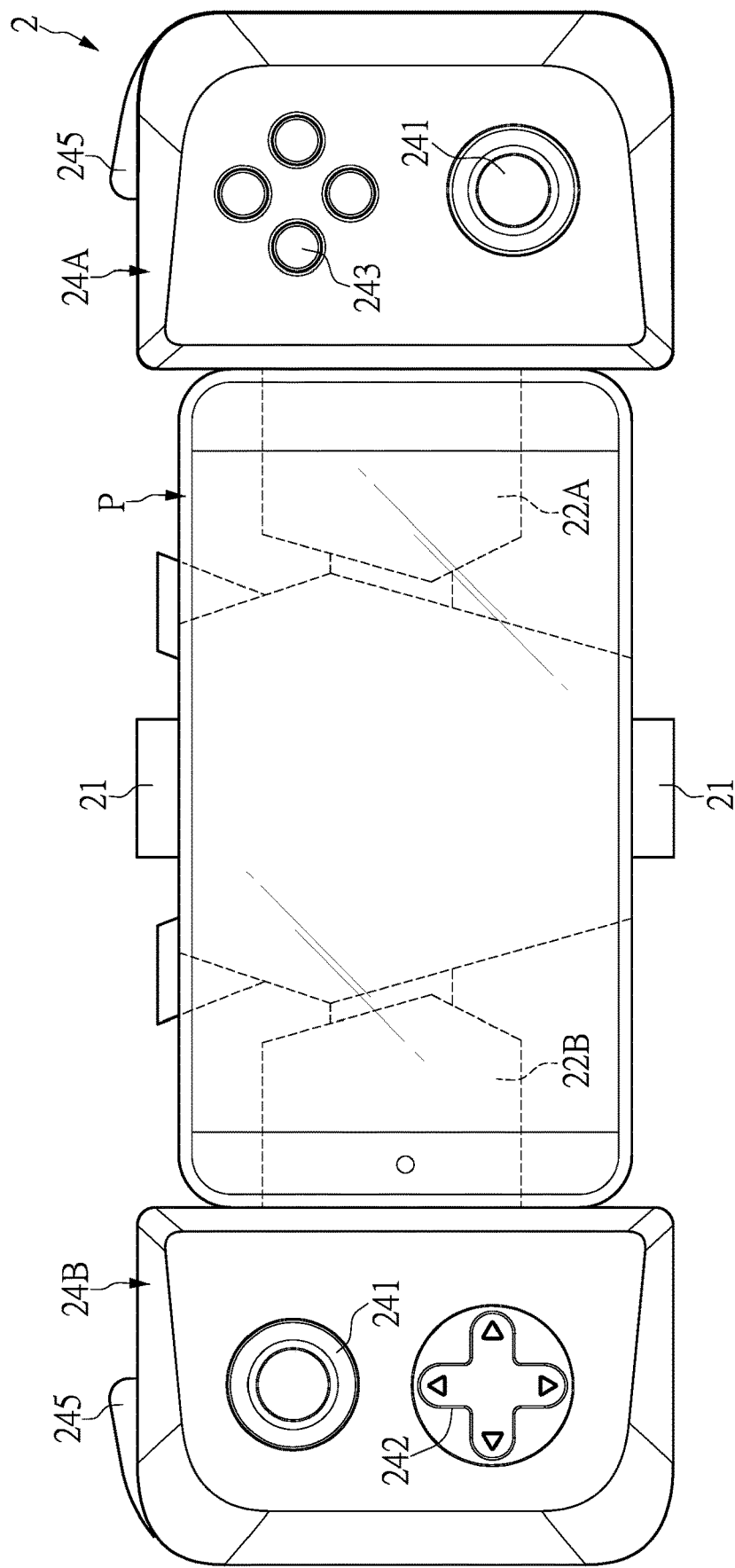
FIG. 7 is a schematic front view of the peripheral device combined with the mobile device according to the second embodiment of the present disclosure.

Referring to FIG. 6 and FIG. 7, a second embodiment of the present disclosure provides a peripheral device 2. A pair of connecting arms 22A, 22B are each slidably connected to a main body 20 along a direction perpendicular to a central line C of the main body 20, and the main body 20 has a clamping portion 21 so as to clamp the mobile device P in place. An insertion slot 240 is formed on a rear side of the at least one control modules 24A, 24B, and a front side of the control modules 24A, 24B is similar to the previous embodiment for having input units 241, 242, 243, 245. The pair of connecting arms 22A, 22B can slide inward to be close to an inside of the main body 20 to be in a storage position (omitted in figure), or the pair of the connecting arms 22A, 22B can slide outward to be in the expanded position, and an end of one of the pair of connecting arms 22A, 22B can be inserted into the insertion slot 240.

The difference between the present embodiment and the previous embodiment is that, the connecting arms 22A, 22B and the control modules 24A, 24B adopt a horizontal sliding manner for storage and expansion.

Third Embodiment

Figure 8:
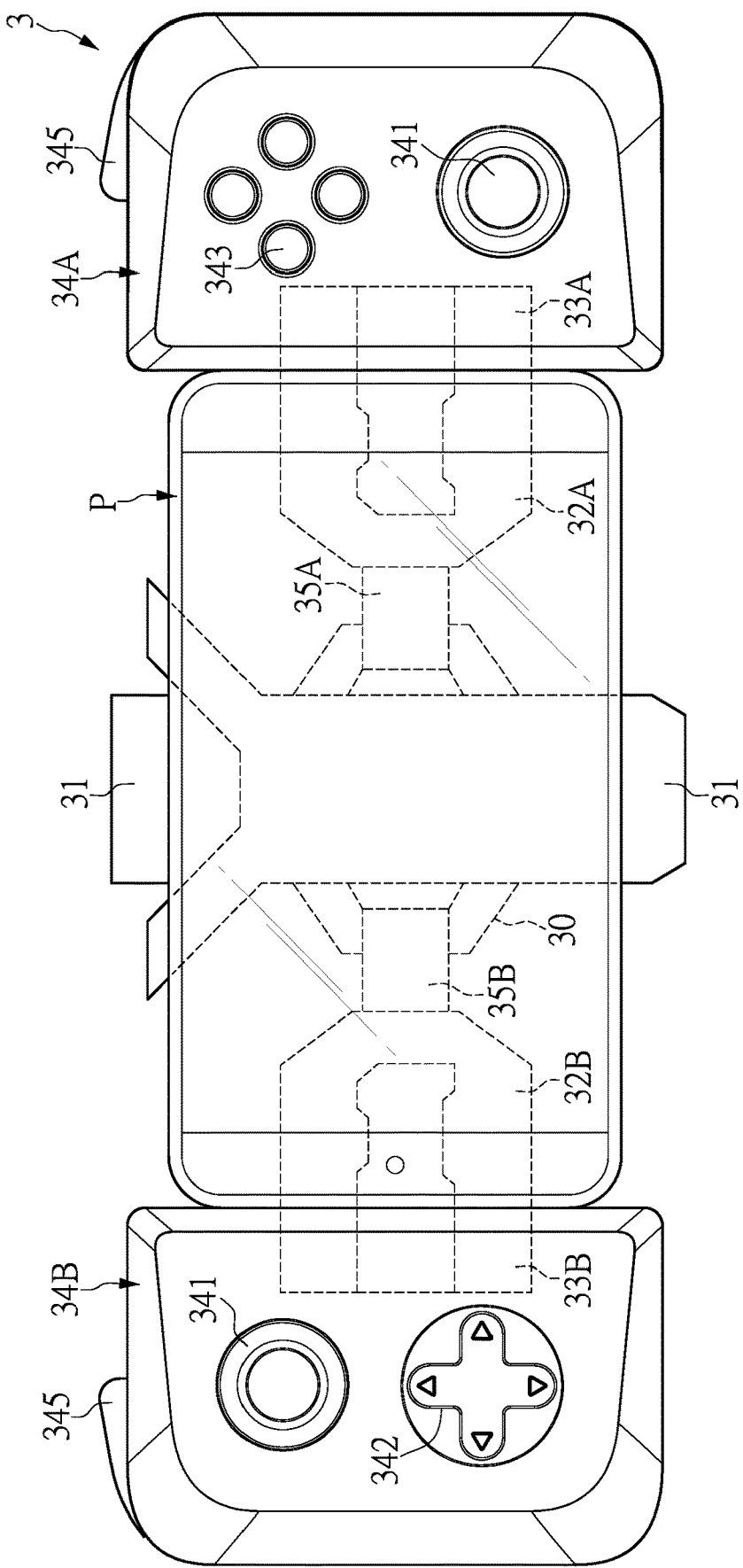
FIG. 8 is a schematic front view of the peripheral device combined with the mobile device according to a third embodiment of the present disclosure.
Figure 9:
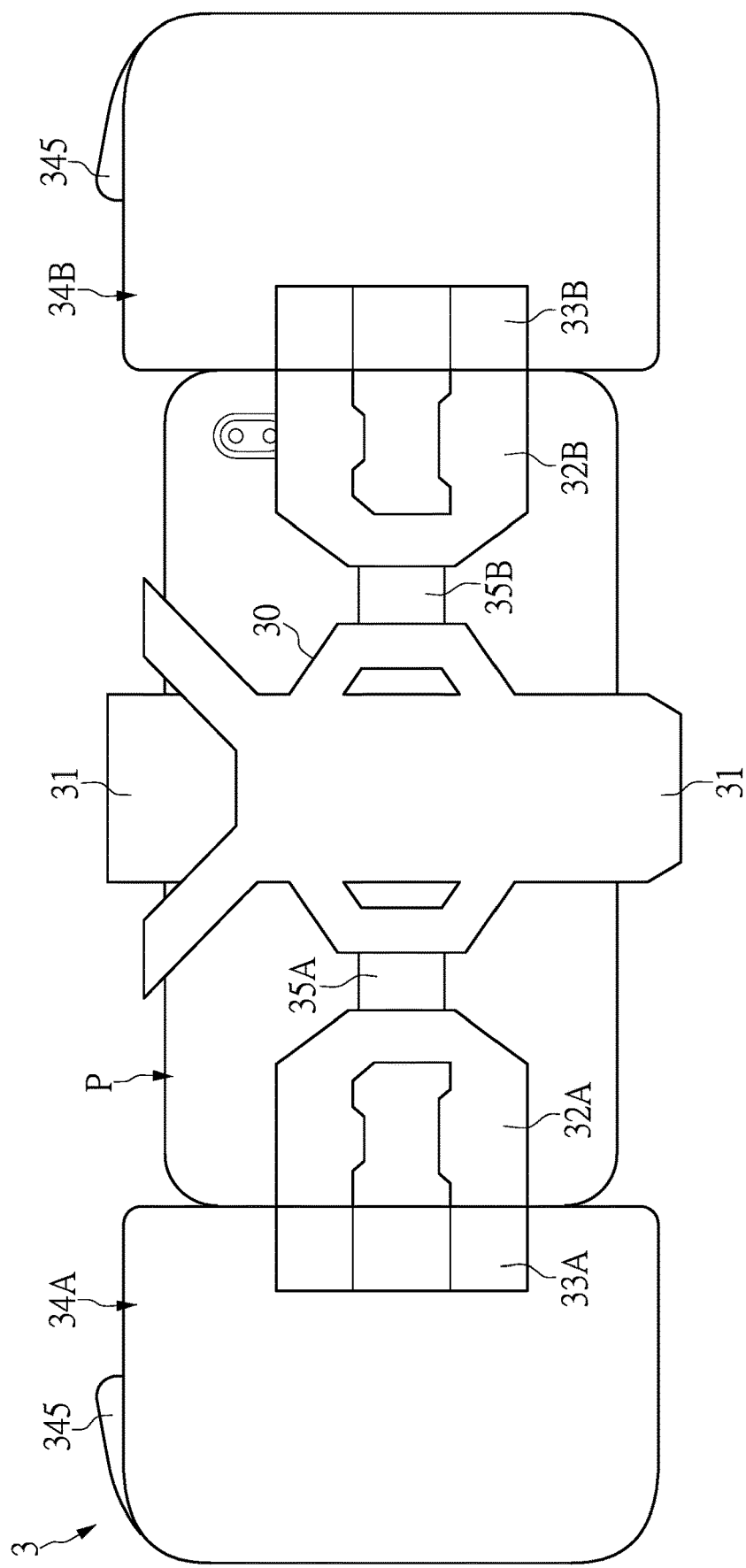
FIG. 9 is a schematic rear view of the peripheral device combined with the mobile device according to the third embodiment of the present disclosure.
Figure 10:
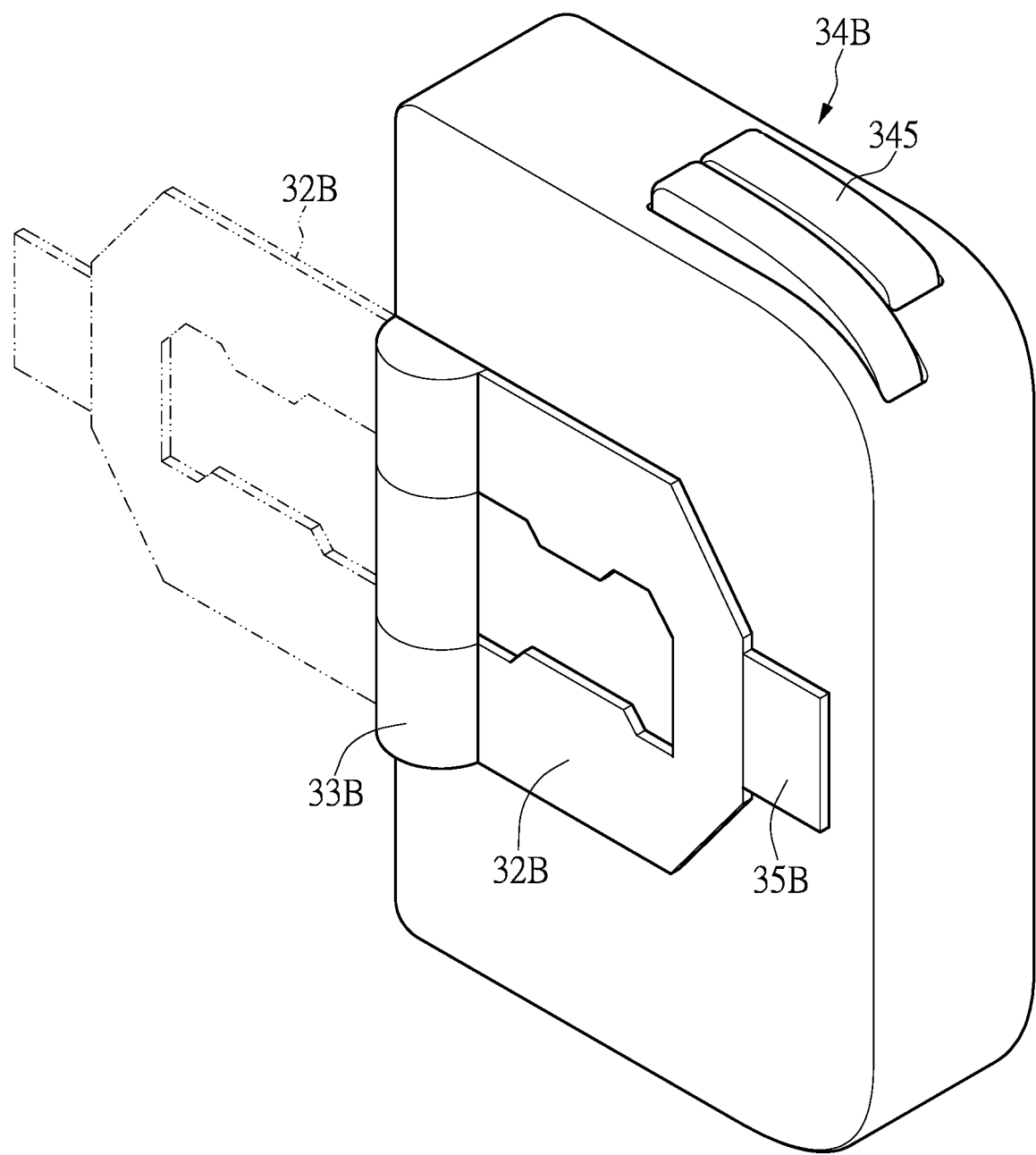
FIG. 10 is a perspective view of a control module of the peripheral device according to the third embodiment of the present disclosure.

As shown in FIG. 8 to FIG. 10, a peripheral device 3 of the present embodiment includes a main body 30, a clamping unit 31, a pair of connecting arms 32A, 32B, and a pair of control modules 34A, 34B. A pair of hinges 33A, 33B are respectively connected between the pair of connecting arms 32A, 32B and the pair of control modules 34A, 34B. More specifically, as shown in FIG. 10, a rotating shaft of the pair of hinges 33A, 33B are provided on one side of the control modules 34A, 34B, and the connecting arms 32A, 32B can be rotated to a rear side of the control modules 34A, 35B to be in the storage position (as shown in FIG. 10), or can be expanded to be parallel to a rear side of the control modules 34A, 34B and be in the expanded position, as shown in FIG. 8 and FIG. 9.

One end of the pair of connecting arms 32A, 32B have connectors 35A, 35B provided thereon for being inserted into the main body 30. Similar to the abovementioned embodiment, the control modules 34A, 34B each has a plurality of input units (341, 342, 343, 345) for inputting signals to the mobile device P.

Fourth Embodiment

Figure 11:
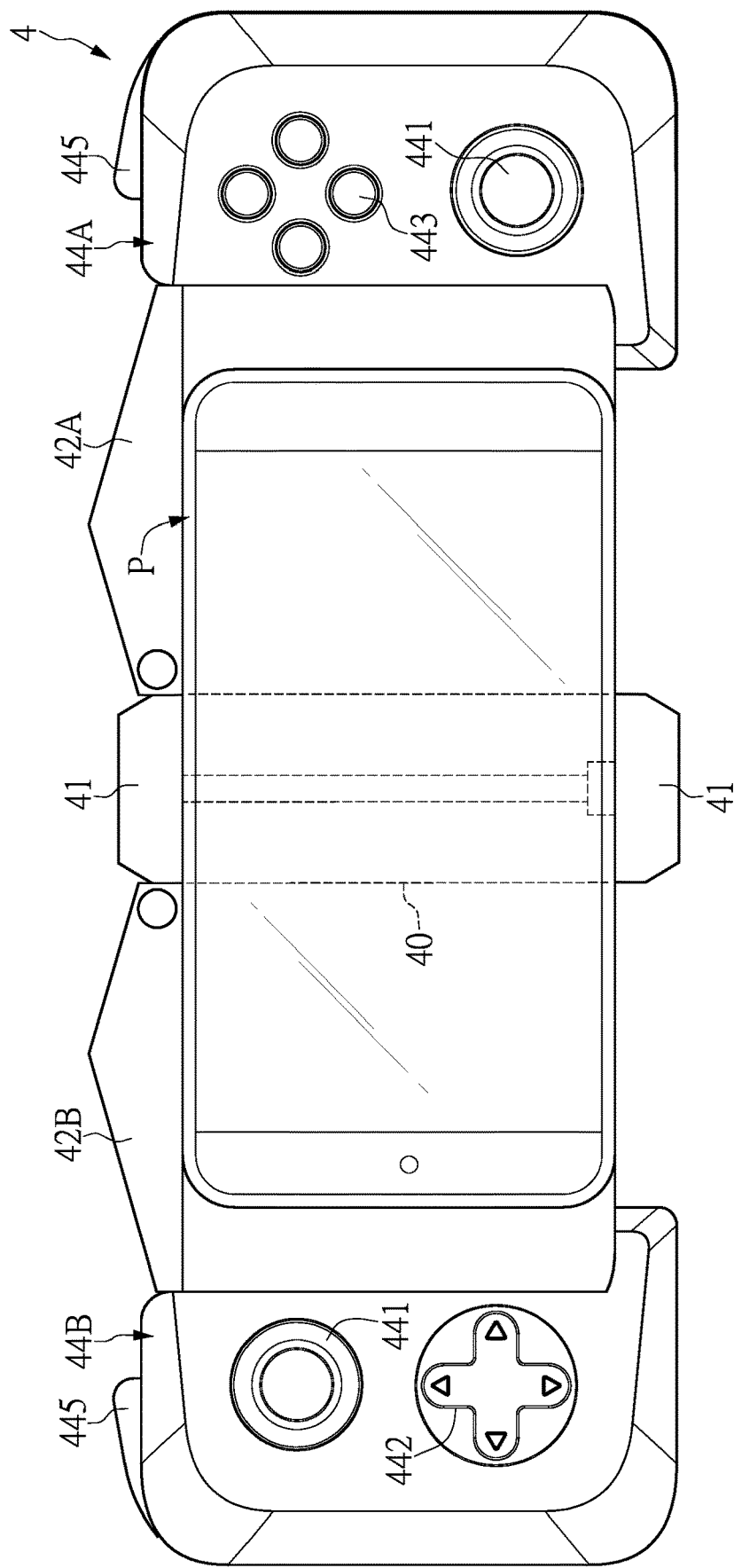
FIG. 11 is a schematic front view of the peripheral device combined with the mobile device according to a fourth embodiment of the present disclosure.
Figure 12:
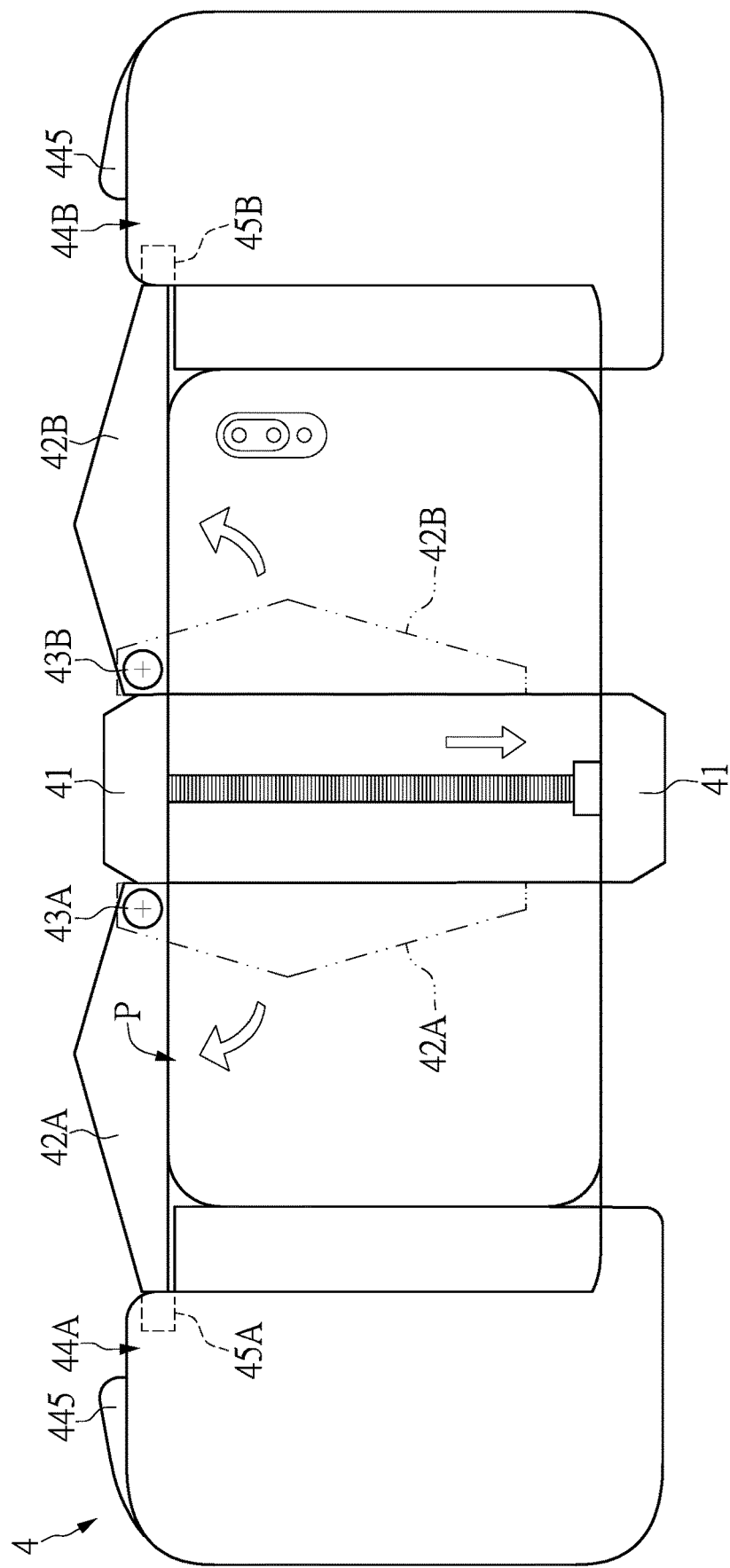
FIG. 12 is a schematic rear view of the peripheral device combined with the mobile device according to the fourth embodiment of the present disclosure.

As shown in FIG. 11 and FIG. 12, a peripheral device 4 of the present embodiment includes a main body 40, a clamping unit 41, a pair of connecting arms 42A, 42B, and a pair of control modules 44A, 44B. One end of the pair of connecting arms 42A, 42B can be rotatably connected to a top end of one side of the main body 40, the one pair of the connecting arms 42A, 42B can be rotated to the one side of the main body 40 to be in the storage position, or the one pair of the connecting arms 42A, 42B can be rotated outwards at 90 degrees perpendicular to a central line of the main body 40 to be in the expanded position, respectively.

In the present disclosure, a pair of hinges 43A, 43B are respectively connected between one end of the pair of connecting arms 42A, 42B and two sides of the top end of the main body 40. In this way, the pair of the connecting arms 42A, 42B can be pressed down against the main body 40, or can be expanded upward to be in an expanded position.

Another end of the pair of connecting arms 42A, 42B have connectors 45A, 45B provided thereon for being inserted into the pair of the control modules 44A, 44B.

Similar to the abovementioned embodiment, each of the control modules 44A, 44B have a plurality of input units (441, 442, 443, 445) for inputting signals to the mobile device P.

Fifth Embodiment

Figure 13:
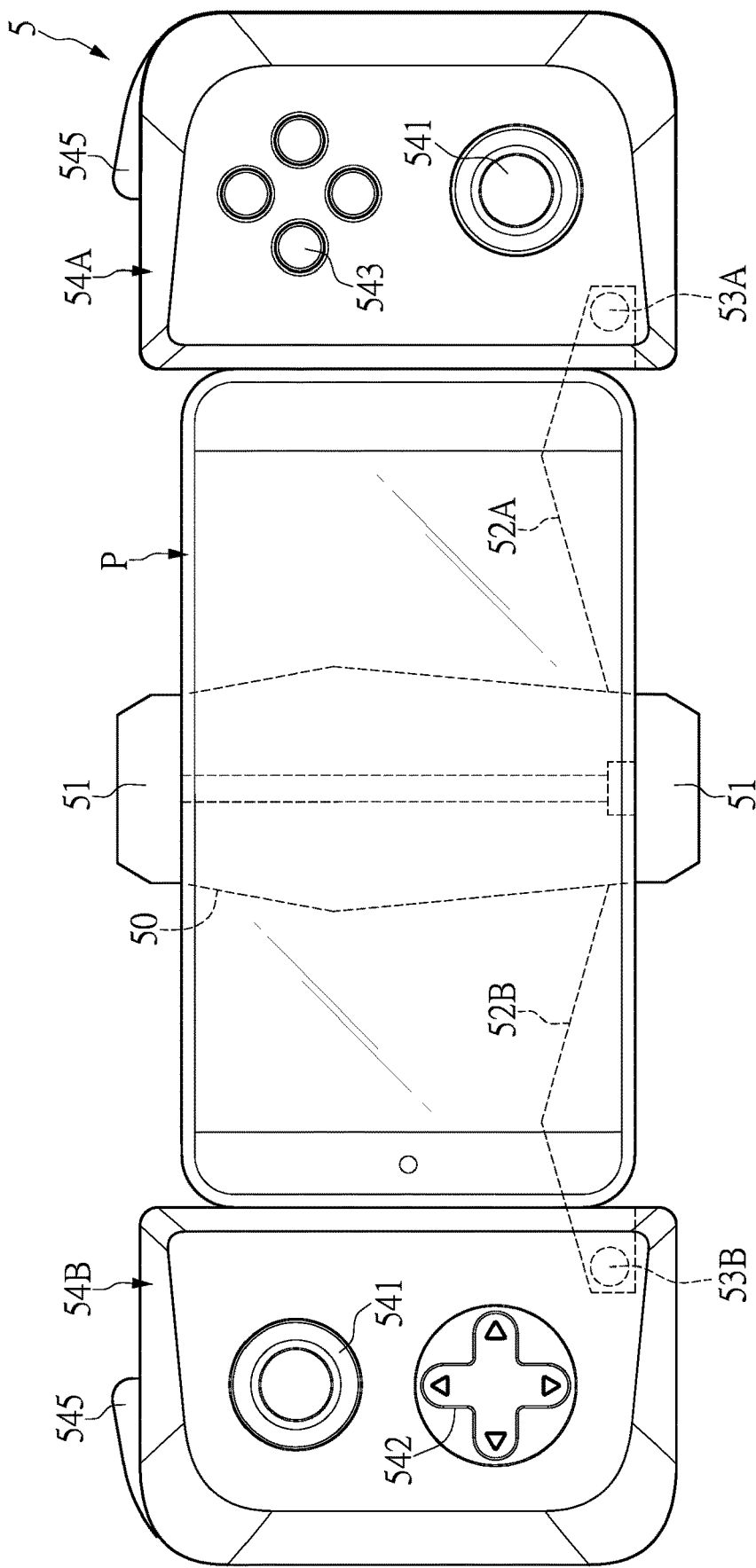
FIG. 13 is a schematic front view of the peripheral device combined with the mobile device according to a fifth embodiment of the present disclosure.
Figure 14:
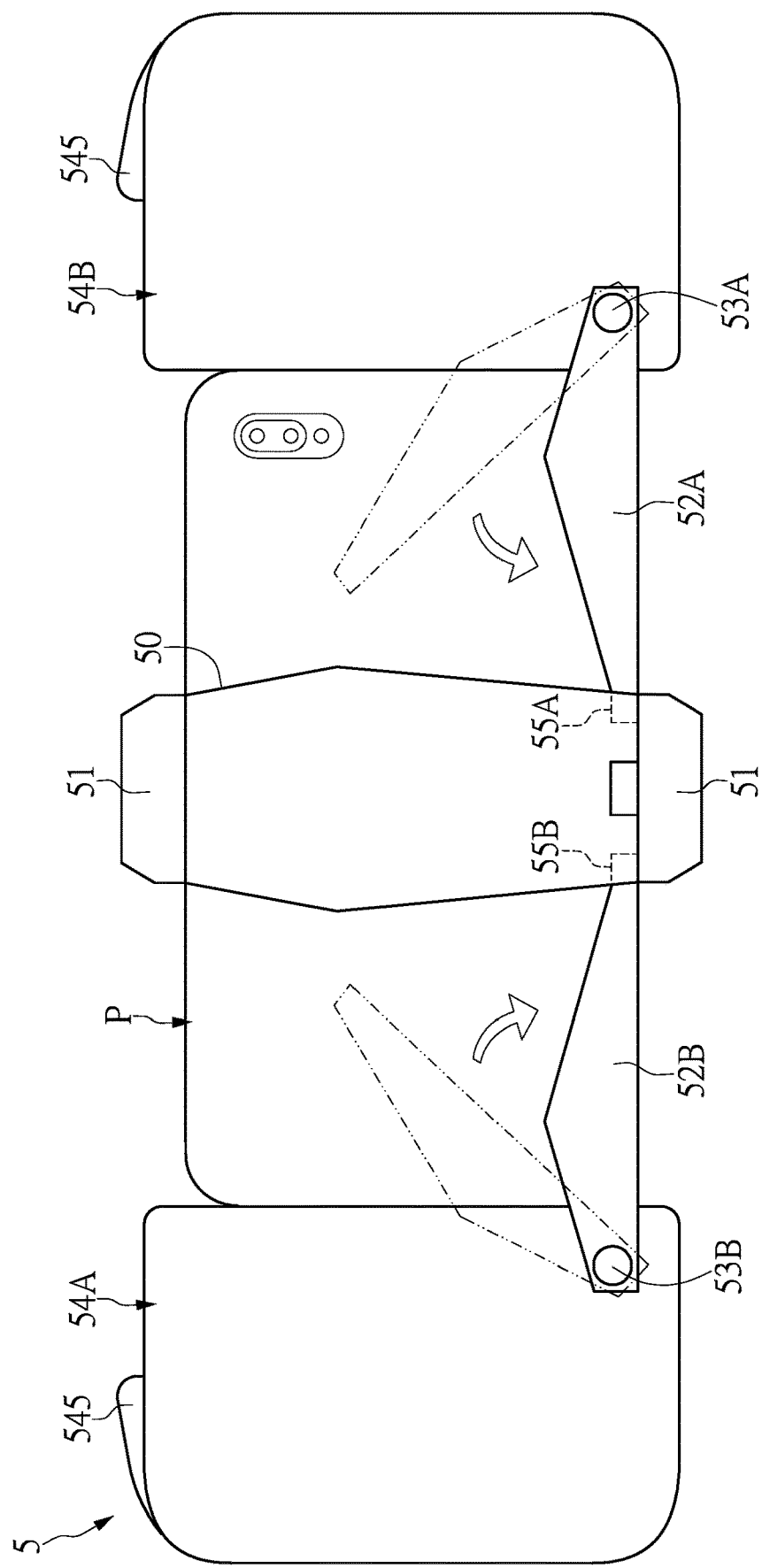
FIG. 14 is a schematic rear view of the peripheral device combined with the mobile device according to the fifth embodiment of the present disclosure.

As shown in FIG. 13 to FIG. 14, a peripheral device 5 of the present embodiment includes a main body 50, a clamping unit 51, a pair of connecting arms 52A, 52B, and a pair of control modules 54A, 54B.

In the present embodiment, one end of the pair of connecting arms 52A, 52B is detachably connected to one side of the main body 50, and another end of the pair of connecting arms 52A, 52B is movably connected to one side of the pair of control modules 54A, 54B, and the pair of connecting arms 52A, 52B can be in a storage position or an expanded position.

When the pair of connecting arms 52A, 52B are in the expanded position, the pair of connecting arms 52A, 52B extend beyond the sides of the main body 50. The pair of control modules 54A, 54B are electrically connected to the mobile device P to transmit signals of the input units (541, 542, 543, or 545) to the mobile device P.

More specifically, the difference between the present embodiment and the previous embodiment is that, one end of the pair of connecting arms 52A, 52B is each rotatably connected to a bottom end of the one side of the pair of control modules 54A, 54B through a pair of hinges 53A, 53B. The pair of connecting arms 52A, 52B can each be rotated to one side of the pair of control modules 54A, 54B to be in the storage position, or the pair of connecting arms 52A, 52B can each be rotated outwards at 90 degrees to be perpendicular to the sides of the pair of control modules 54A, 54B to be in the expanded position. The another end of the pair of connecting arms 52A, 52B are connected to the main body 50 through connectors 55A, 55B.

Beneficial Effects of the Embodiments

In conclusion, one of the beneficial effects of the present disclosure is that, in the peripheral device provided herein, through the technical solutions of the connecting arms being movably connected between the main body and the control module, the connecting arms can be moved close to the one side of the main body to be in the storage position, or can be extended away from the one side of the main body to be in the expanded position. In this way, the peripheral device of the present disclosure facilitates convenient storage or carrying.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A peripheral device adapted for connecting to a mobile device, wherein
the mobile device has two sets of side edges, the peripheral device comprising:
a main body including a clamping unit, the clamping unit having a pair of clamping portions arranged in along a central line of the main body, the pair of the clamping portions being able to be next to each other or be elastically pulled apart from each other, wherein the pair of the clamping portions clamps one set of the side edges of the mobile device, so as to fix the mobile device in place, the main body having two lateral sides which are parallel to the central line;
a pair of hinges respectively disposed on two lateral sides of the main body, each of the pair of the hinges having an axis inclined to the central line of the main body;
a pair of connecting arms being rotatably connected to the pair of hinges of the main body, respectively, wherein the pair of the connecting arms is configured to be rotatable to be close to the lateral sides of the main body to be in a storage position, to be rotatable to a rear side of the main body to be in a supporting position functioning as supporting legs to support the main body in a titled manner, or extend away from the lateral sides of the main body to be in an expanded position; and
a pair of control modules, each of the pair of the control modules including at least one input unit, and the pair of the control modules being detachably connected to a free end of the the pair of the connecting arms;
wherein, when the the pair of the connecting arms is in the expanded position, the pair of control modules is adjacent to the mobile device to provide control of the mobile device.

2. The peripheral device according to claim 1, wherein each of the pair of the hinges includes a shaft sleeve fixed onto the main body, and a rotating shaft partly sleeved on the shaft sleeve, and wherein the rotating shaft is rotatably connected to the shaft sleeve, and the connecting arm is fixed to the rotating shaft.

3. The peripheral device according to claim 1, wherein an end of each of the pair of connecting arms is a connector, and the connecter is inserted in the at least one control module.

* * * * *